United States Patent
Toivanen et al.

(12)

(10) Patent No.: US 12,456,340 B2
(45) Date of Patent: Oct. 28, 2025

(54) ACCESS GATE DEVICE AND A METHOD FOR CONTROLLING AN ACCESS GATE DEVICE

(71) Applicant: KONE Corporation, Helsinki (FI)

(72) Inventors: Jari Toivanen, Helsinki (FI); Kimmo Lahdensivu, Helsinki (FI)

(73) Assignee: KONE CORPORATION, Helsinki (FI)

( * ) Notice: Subject to any disclaimer, the term of this patent is extended or adjusted under 35 U.S.C. 154(b) by 78 days.

(21) Appl. No.: 18/386,478

(22) Filed: Nov. 2, 2023

(65) Prior Publication Data
US 2024/0071158 A1 Feb. 29, 2024

Related U.S. Application Data

(63) Continuation of application No. PCT/EP2021/063977, filed on May 26, 2021.

(51) Int. Cl.
 *G07C 9/10* (2020.01)
 *H04N 13/282* (2018.01)

(52) U.S. Cl.
 CPC ............. *G07C 9/10* (2020.01); *H04N 13/282* (2018.05); *E05Y 2400/44* (2013.01); *G07C 2209/63* (2013.01)

(58) Field of Classification Search
 CPC ... G07C 9/10; G07C 9/20; G07C 9/38; G07C 2209/63; G08B 13/08; G06V 10/25;
 (Continued)

(56) References Cited

U.S. PATENT DOCUMENTS 6,744,369 B2 * 6/2004 Sata .......................... G07C 9/10
 235/382
11,024,105 B1 * 6/2021 Brand ................ G06K 7/10366
 (Continued)

FOREIGN PATENT DOCUMENTS

WO WO 2020/240602 A1 12/2020

OTHER PUBLICATIONS

International Search Report, issued in PCT/EP2021/063977, dated Feb. 22, 2022.
(Continued)

*Primary Examiner* — Adnan Aziz
(74) *Attorney, Agent, or Firm* — Birch, Stewart, Kolasch & Birch, LLP

(57) ABSTRACT

An access gate device includes one or more 3D cameras arranged at least on an entry side of the access gate device and a control unit. Each of the one or more 3D cameras is configured to provide 3D depth data of a view range of said 3D camera. The control unit is configured to: define at least two consecutive volumetric detection zones in front of the access gate device at least on the entry side, detect a presence of at least one user inside at least one of the volumetric detection zones on the entry side based on the 3D depth data obtained from at least one of the at least one or more 3D cameras arranged on the entry side, and generate detection data in response to the detection of the presence of the at least one user for controlling access of users via the access gate device. A method for controlling an access gate device is also disclosed.

20 Claims, 5 Drawing Sheets

(58) Field of Classification Search
CPC ...... G06T 2207/10028; E05F 2015/767; E05F 15/73; E05Y 2400/40; E05Y 2400/44; E05Y 2900/40; H04N 13/282; H04N 13/271; H04N 13/20

See application file for complete search history.

(56) References Cited

U.S. PATENT DOCUMENTS

| | | | |
|---|---|---|---|
| 2004/0017929 A1* | 1/2004 | Bramblet | G07C 9/00 382/103 |
| 2011/0205340 A1* | 8/2011 | Garcia | G01S 17/08 348/46 |
| 2013/0135438 A1 | 5/2013 | Lee et al. | |
| 2013/0201286 A1* | 8/2013 | Schockmel | G08C 19/00 348/46 |
| 2019/0172039 A1* | 6/2019 | Kambara | G06V 20/52 |
| 2019/0218847 A1 | 7/2019 | Agam et al. | |
| 2020/0097758 A1* | 3/2020 | Basso | G06V 20/64 |
| 2020/0118375 A1* | 4/2020 | Tagawa | G06V 40/67 |
| 2020/0286059 A1* | 9/2020 | Bengtsson | G06F 21/554 |
| 2020/0334835 A1* | 10/2020 | Buibas | G06V 20/64 |
| 2021/0074099 A1 | 3/2021 | Caroselli et al. | |
| 2022/0084342 A1* | 3/2022 | Masuda | G05B 19/042 |
| 2022/0114871 A1* | 4/2022 | Lau | G08B 29/188 |
| 2024/0161563 A1* | 5/2024 | Sakaguchi | G07C 9/10 |

OTHER PUBLICATIONS

Written Opinion of the International Searching Authority, issued in PCT/EP2021/063977, dated Feb. 22, 2022.

* cited by examiner

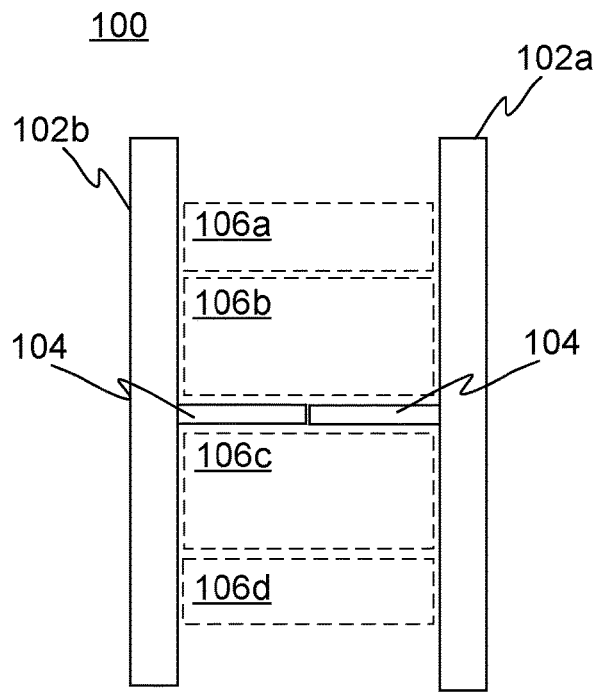
FIG. 1    PRIOR ART
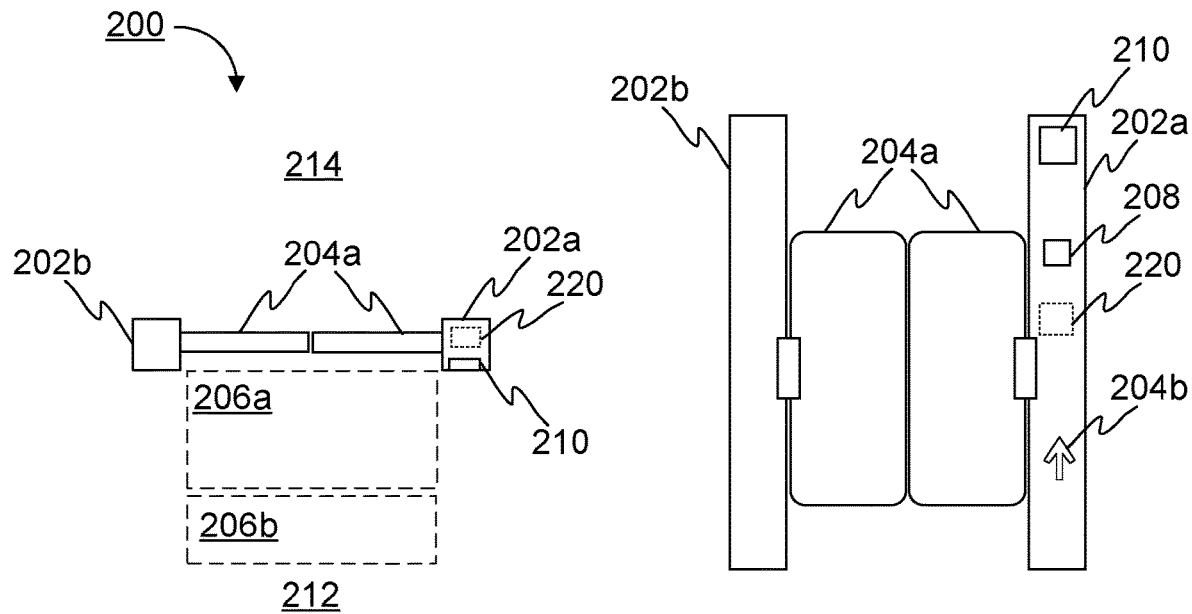
FIG. 2A
FIG. 2B

ACCESS GATE DEVICE AND A METHOD FOR CONTROLLING AN ACCESS GATE DEVICE

CROSS REFERENCE TO RELATED APPLICATIONS

This application is a Continuation of PCT International Application No. PCT/EP2021/063977, filed on May 26, 2021, which is hereby expressly incorporated by reference into the present application.

TECHNICAL FIELD

The invention concerns in general the technical field of access gate devices. Especially the invention concerns providing data for controlling access gate devices.

BACKGROUND

In various user access or entry points an access gate device, such as a turnstile, a security barrier, or a security gate, may use a curtain of light type of sensors to detect a user approaching the access gate device. A user may be granted an access via the access gate device only when the user has been identified and/or authorized. FIG. 1 illustrates an example of a typical structure of an access gate device 100. FIG. 1 illustrates a top view of the typical access gate device 100. The typical access gate device 100 comprises two parallel side walls, e.g. guide elements, 102a, 102b extending in a horizontal direction, i.e. a depth direction. The curtain of light type sensors are arranged to the side walls 102a, 102b of the access gate device 100 to form typically two or more detection zones 106a-106d on both sides of the access gate device 100. A physical user restriction device 104 may divide the access gate device 100 into the two sides, e.g. into a first side, e.g. an entry side, and a second side, e.g. an exit side. For example, in the example of FIG. 1, the curtain of light type sensors form two detection zones 106a, 106b on the first side and two detection zones 106c, 106d on the second side. At least one drawback of the access gate devices using the curtain of light type sensors for detecting the users may be that the footprint, i.e. the coverage area, of the access gate device 100 is substantially large, which causes that each access gate device requires substantially large space.

Thus, there is a need to develop further solutions in order to improve the operation of access gate devices.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an access gate device and a method for controlling an access gate device. Another objective of the invention is that the access gate device the method for controlling an access gate device enable a reduced footprint of the access gate device.

The objectives of the invention are reached by an access gate device and a method for controlling an access gate device a method as defined by the respective independent claims.

According to a first aspect, an access gate device is provided, wherein the access gate device comprises: one or more three-dimensional (3D) cameras arranged at least on an entry side of the access gate device, each of the one or more 3D cameras is configured to provide 3D depth data of a view range of said 3D camera; and a control unit configured to: define at least two consecutive volumetric detection zones in front of the access gate device at least on the entry side, wherein the view range of the one or more 3D cameras arranged on the entry side covers the at least two volumetric detection zones on the entry side; detect a presence of at least one user inside at least one of the volumetric detection zones on the entry side based on the 3D depth data obtained from at least one of the at least one or more 3D cameras arranged on the entry side; and generate detection data in response to the detection of the presence of the at least one user for controlling access of users via the access gate device.

The access gate device may comprise at least two 3D cameras arranged at least on the entry side of the access gate device.

Alternatively or in addition, the access gate device may further comprise one or more 3D cameras arranged on an exit side of the access gate device, wherein the control unit may further be configured to: define at least two consecutive volumetric detection zones in front of the access gate device on the exit side, wherein the view range of the one or more 3D cameras arranged on the exit side may cover the at least two volumetric detection zones on the exit side; detect a presence of at least one user inside at least one of the volumetric detection zones on the exit side based on the 3D depth data from at least one of the one or more 3D cameras arranged on the exit side; and generate further detection data in response to the detection of the presence of the at least one user for controlling access of the users via the access gate device.

The access gate device may comprise at least two 3D cameras arranged on the exit side of the access gate device.

Alternatively, the access gate device may further comprise at least one sensor device arranged on an exit side of the access gate device to provide sensor data, wherein the control unit may be configured to: detect at least one user approaching the access gate device from the exit side based on the sensor data obtained from the at least one sensor device, and generate further detection data in response to the detection of the at least one user approaching the access gate device for controlling access of users via the access gate device.

The at least one sensor device may be an infrared camera.

The one or more 3D cameras may comprise one or more Time-of-Flight (ToF) cameras, one or more stereo cameras, and/or one or more cameras based on structured light.

The control unit may further be configured to adjust at least one dimension of at least one of the at least two volumetric detection zones.

The access gate device may further comprise at least one user restriction device and at least one user identification device or providing user identification data, wherein the control unit may further be configured to control the at least one user restriction device to allow access via the access gate device, when the identification data relates to an identified user, and to control the at least one user restriction device to restrict access via the access gate device, when the identification data relates to the unidentified user.

The 3D depth data may represent at least one depth image and/or 3D point cloud data.

The access gate device may comprise two vertical poles forming a passageway of the access gate device.

The one or more 3D cameras may be arranged to at least one of the two vertical poles at least on the entry side of the access gate device.

According to a second aspect, a method for controlling an access gate device as described above is provided, wherein the method comprises: defining, by a control unit, at least two consecutive volumetric detection zones in front of the access gate device at least on an entry side of the access gate device; providing, by one or more 3D cameras arranged at least on the entry side of the access gate device, 3D depth data of a view range of each 3D camera, wherein a view range of the one or more 3D cameras arranged on the entry side covers the at least two volumetric detection zones at the entry side; detecting, by the control unit, a presence of at least one user inside at least one of the volumetric detection zones on the entry side based on the 3D depth data obtained from at least one of the one or more 3D cameras arranged on the entry side; and generating, by the control unit, detection data in response to the detection of the presence of the at least one user for controlling access of users via the access gate device.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of a typical structure of an access gate device according to prior art.

FIGS. 2A and 2B illustrate schematically an example of an access gate device.

DESCRIPTION OF THE EXEMPLIFYING EMBODIMENTS

Figure 3:
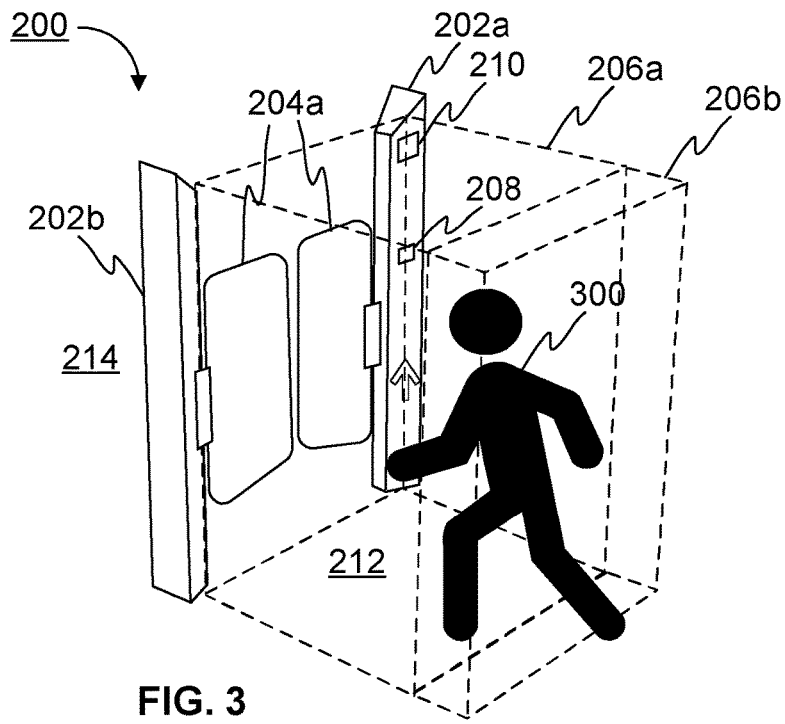
FIG. 3 illustrates schematically a perspective view of the example access gate device of FIGS. 2A and 2B.

FIGS. 2A and 2B illustrate schematically an example of an access gate device 200. FIG. 2A illustrates a top view of the access gate device 200. FIG. 2B illustrates a front view of the access gate device 200 from a first side, e.g. an entry side 212, of the access gate device 200. The access gate device 200 may be approached by at least one user 300 from two sides, either from a first side, e.g. the entry side, 212 of the access gate device 200 or from a second side, e.g. an exit side, 214 of the access gate device 200. Although the first side of the access gate device 200 is referred as the entry side 212 access gate device 200 and the second side of the access gate device 200 is referred as the exit side 214 of the access gate device 200 throughout the application, either one of the sides of the access gate device 200 may be used as the entry side 212 and the other side of the access gate device 200 may be used as the exit side 214. The access gate device 200 may for example be a security gate, a turnstile, a faregate, or any other entry point. The access gate device 200 comprises one or more three-dimensional (3D) cameras 210, 210a-210d arranged at least on the entry side 212 of the access gate device 200 and a control unit 220. In the example of FIGS. 2A and 2B, the access gate device 200 comprises one 3D camera 210 arranged on the entry side 212 of the access gate device 200. However, the access gate device 200 may also comprise more than one 3D camera 210, 210a-210d arranged on the entry side 212 of the access gate device 200 and/or on the exit side of the access gate device 200. The control unit 220 is implemented as a part of the access gate device 200. In other words, the control unit 220 is internal to the access gate device 200. The control unit 220 may be configured to control operations of the access gate device 200. The one or more 3D cameras 210, 210a-210d are communicatively coupled to the control unit 220. The communication between the one or more 3D cameras 210, 210a-210d and the control unit 220 may be based on any known communication technology, either wired or wireless.

The access gate device 200 may further comprise one or more other access gate related devices, such as user restrictions device(s), user identification device(s), screen(s), etc. According to an example, the access gate device 200 may further comprise at least one user restriction device 204a, 204b for restricting access of unidentified and/or unauthorized users via the access gate device 200. The at least one user restriction device 204a, 204b may comprise at least one physical restriction device 204a, e.g. door panel(s), barrier (s), or any other physical user restriction device. The at least one physical restriction device 204a may provide a physical restriction to restrict access of unidentified and/or unauthorized users via the access gate device 200. In the example of FIGS. 2A and 2B the access gate device 200 comprises two door panels acting as the at least one physical restriction device 204a. If the access gate device 200 comprises at least one physical restriction device 204a, the at least one physical restriction device 204a may divide the access gate device 200 into a first side, e.g. the entry side 212, and a second side, e.g. an exit side 214. Alternatively or in addition, the at least one restriction device 204a, 204b may comprise at least one visual restriction device 204b and/or audible restriction device (for sake of clarity not shown in Figures). The at least one visual restriction device 204b may generate a visual alarm to restrict access of unidentified and/or unauthorized users via the access gate device 200. The at least one audible restriction device may generate an audible alarm to restrict access of unidentified and/or unauthorized users via the access gate device 200. In the example of FIG. 2B the access gate device 200 comprises one visual restriction device 204b. The at least one user restriction device 204a, 204b may be communicatively coupled to the control unit 220. The communication between the at least one user restriction device 204a, 204b and the control unit 220 may be based on any known communication technology, either wired or wireless.

According to another example, the access gate device 200 may further comprise at least one user identification device 208 for providing user identification data to be used in a user identification. The user identification may be based on using keycards; tags; identification codes; such as personal identity number (PIN) code, ID number; and/or biometric technologies, such as fingerprint, facial recognition, iris recognition, retinal scan, voice recognition, etc. The control unit 220 may be configured to control the at least one user restriction device 204a, 204b to allow access via the access gate device 200, when the identification data relates to an identified and/or authorized user, and to control the at least one user restriction device 204a, 204b to restrict access via the access gate device 200, when the identification data relates to the unidentified and/or unauthorized user. The control unit 220 may obtain the user identification data from the at least one user identification device 208. Preferably, the control unit 220 may obtain the user identification data after a detection of a presence of at least one user 300, 300a, 300b approaching the access gate device 200 from the entry side 212 of the access gate device 200 and/or from the exit side 214 of the access gate device 200 as will be described. At least one user identification device 208 may be arranged on the entry side 212 of the access gate device 200 for proving user identification from the entry side 212 and/or at least one user identification device 208 may be arranged on the exit side 214 of the access gate device 200 for proving user identification from the exit side 212. The at least one user identification device 208 may be communicatively coupled to the control unit 220. The communication between the at least one user identification device 208 and the control unit 220 may be based on any known communication technology, either wired or wireless.

Each of the one or more 3D cameras 210, 210a-210d of the access gate device 200 is configured to provide 3D depth data of a view range of said 3D camera 210, 210a-210d. With the term "view range of a 3D camera" is meant throughout this application a 3D space, i.e. a scene, from which the 3D camera may provide the 3D depth data. The 3D depth data may represent at least one depth image and/or 3D point cloud data. In other words, the 3D depth data may comprise at least one depth image and/or 3D point cloud data. The one or more 3D cameras 210, 210a-210d may continuously provide the 3D depth data. The one or more 3D cameras 210, 210a-210d may comprise one or more Time-of-Flight (ToF) cameras, one or more stereo cameras, and/or one or more cameras based on structured light. Preferably, at least the one or more 3D cameras 210, 210a-210d arranged on the entry side 212 of the access gate device 200 may be ToF cameras. More preferably, the one or more 3D cameras 210, 210a-210d arranged on the entry side 212 of the access gate device 200 and on the exit side 214 of the access gate device 200 may be ToF cameras. The ToF cameras are substantially quick and may provide the 3D depth data in real-time. The ToF cameras provide non-intrusive 3D depth data, which enables an improved privacy protection. The ToF cameras do not need ambient illumination for optimal performance, which enables that ToF cameras may be used also in low light or in complete darkness. A structure of the ToF camera is substantially simple. Each ToF camera 210, 210a-210d comprises a light source, e.g. infrared (IR) light source, configured to emit light and a sensor array device configured to obtain the reflected light. The ToF camera 210, 210a-210d is configured to create a depth image data comprising at least one depth image based on the obtained reflected light. The depth image data may be converted into a 3D point cloud data by using optical parameters of the ToF camera 210, 210a-210d. In the 3D point cloud data, each image pixel has its 3D coordinates in space. The conversion of the depth image data into the 3D point cloud may be performed by the ToF camera 210, 210a-210d and/or the control unit 220. If the access gate device 200 comprises at least two ToF cameras 210, 210a-210d arranged on the same side 212, 214 of the access gate device 200, the control unit 220 may be configured to combine the depth image data from the at least two ToF cameras 210, 210a-210d into the same 3D point cloud data.

The control unit 220 is configured to define at least two consecutive volumetric, i.e. 3D, detection zones 206a-206d in front of the access gate device 200 at least on the entry side 212. The defined at least two volumetric detection zones 206a-206d are virtual, i.e. imaginary, detection zones. The at least two volumetric detection zones 206a-206d are consecutive in a passage direction of the access gate device 200, i.e. in a depth direction. In the example of FIG. 2A, two consecutive volumetric detection zones 206a, 206b in front of the access gate device 200 on the entry side 212 of the access gate device 200 are illustrated. FIG. 3 illustrates a perspective view of the example access gate device 200 of FIGS. 2A and 2B to illustrate the three-dimensionality of the two consecutive volumetric detection zones 206a, 206b defined in front of the access gate device 200 on the entry side 212 of the access gate device 200. In the example of FIGS. 2A and 3, the at least two consecutive volumetric detection zones 206a, 206b are defined in front of the access gate device 200 on the entry side 212 of the access gate device 200, but the control unit 220 may further define at least two consecutive volumetric detection zones 206c, 206d also in front of the access gate device 200 on the exit side 214 of the access gate device 200 as will be described later in this application. The at least two volumetric detection zones 206a-206d may be defined in a 3D coordinate system. The dimensions of the detection zones 206a-206d may be defined in absolute coordinates, e.g. in meters, or in relative coordinates. In the example of FIG. 3 each volumetric detection zone 206a, 206b has a rectangular box shape. However, the at least two volumetric detection zones 206a-206d may also have any other shape. The view range of the one or more 3D cameras 210 arranged on the entry side 212 covers the at least two volumetric detection zones 206a, 206b on the entry side 212. In other words, the 3D depth data may be provided from the at least two volumetric detection zones 206a, 206b on the entry side 212.

According to an example, the control unit 220 may further be configured to adjust at least one dimension of at least one of the at least two volumetric detection zones 206a-206d. The adjustment enables that the size of the detection zones 206a-206d may be adjusted according to need. Preferably, the at least two volumetric detection zones 206a-206d may have the same size in a height direction, i.e. vertical direction, and in a width direction. According to an example, the dimensions of the at least two volumetric detection zones 206a-206d in the height direction may be defined according to the height of the access gate device 200. According to another example, the dimensions of the at least two volumetric detection zones 206a-206d in the width direction may be defined according to the width of the access gate device 200, i.e. the width of a passageway of the access gate device 200. The at least two volumetric detection zones 206a-206d may each have different dimensions with each other in a depth direction, at least one of the at least two detection zones 206a-206d may have a different dimension in the depth direction, or the at least two volumetric detection zones 206a-206d may all have the same dimensions with each other in the depth direction.

The control unit 220 is further configured to detect a presence of at least one user 300 inside at least one of the at least two volumetric detection zones 206a, 206b on the entry side 212 based on the 3D depth data obtained from at least one of the one or more 3D cameras 210, 210a, 210b arranged on the entry side 212 of the access gate device 200. The control unit 220 may obtain the 3D depth data from the one or more 3D cameras 210, 210a, 210b arranged on the entry side 212 continuously. For example, in the example of FIG. 3, the control unit 220 may detect the presence of the user 300 inside the volumetric detection zones 206a, 206b on the entry side 212 based on the 3D depth data obtained from the 3D camera 210 arranged on the entry side 212 of the access gate device 200. In response to the detection of the presence of the at least one user 300, the control unit 220 is further configured to generate detection data for controlling access of users via the access gate device 200. The generated detection data may represent the presence of the at least one user 300.

The use of the one or more 3D cameras 210, 210a-210d together with the at least two consecutive volumetric detection zones 206a-206d for detecting the users enables that the footprint, i.e. a coverage area, of the access gate device 200 may be reduced. This enables that a structure of the access gate device 200 may be formed by two vertical poles 202a, 202b, e.g. a first pole 202a and a second pole 202b, arranged next to each other at a predefined distance from each other. The predefined distance may be the width of a passageway of the access gate device 200. In other words, the access gate device 200 comprises two vertical poles 202a, 202b forming a passageway of the access gate device 200 as illustrated in the example of FIGS. 2A, 2B, and 3. The footprint of the access gate device 200 may be reduced to the coverage area defined by the two vertical poles 202a, 202b. The access gate device 200 using the one or more 3D cameras 210, 210a-210d together with the at least two consecutive volumetric detection zones 206a-206d for detecting the users 300 simulates, i.e. imitates, a similar operation as access gate devices using a curtain of light type sensors for detecting the users (e.g. the access gate device 100 illustrated in FIG. 1), but physical sidewalls on the entry side 212 and on the exit side 214 and the curtain of light type sensors are not needed. Thus, the access gate device 200 requires substantially less space than the access gate devices using the curtain of light type sensors for detecting the users.

At least one of the one or more 3D cameras 210, 210a-210d may be arranged to one pole 202a, 202b of the two vertical poles 202a, 202b at least on the entry side 212 of the access gate device 200. If the access gate device 200 comprises one 3D camera 210 arranged on the entry side 212 of the access gate device 200, the one 3D camera 210 may preferably be arranged to one of the poles 202a, 202b substantially as high as possible. This enables as unobstructed view range of the 3D camera 210 as possible. For example, in cases where more than one user 300, 300a, 300b is located inside the at least two consecutive volumetric detection zones 206a, 206b, the user(s) closer to the 3D camera 210 may prevent the detection of the other user(s) behind the user closer to the 3D camera 210, if the one 3D camera 210 is arranged low in the vertical direction to the pole 202a, 202b. For example, in the example of FIGS. 2B and 3, the one 3D camera 210 is arranged to the first pole 202a as high as possible.

Figure 4A:
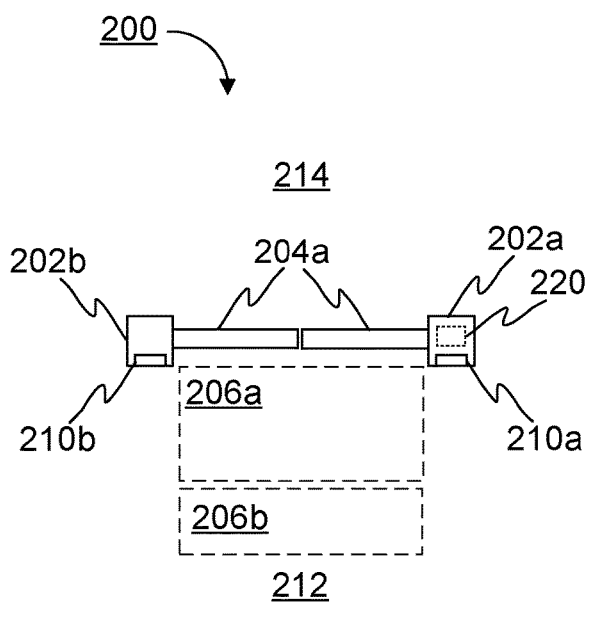
FIGS. 4A and 4B illustrates schematically another example of the access gate device.
Figure 4B:
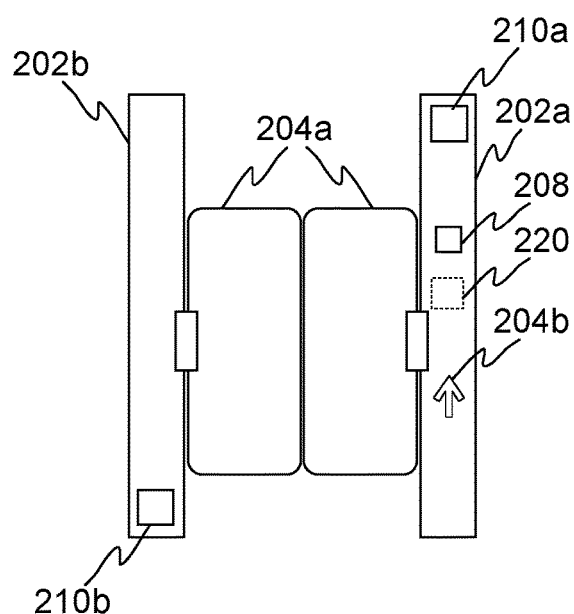
Figure 4C:
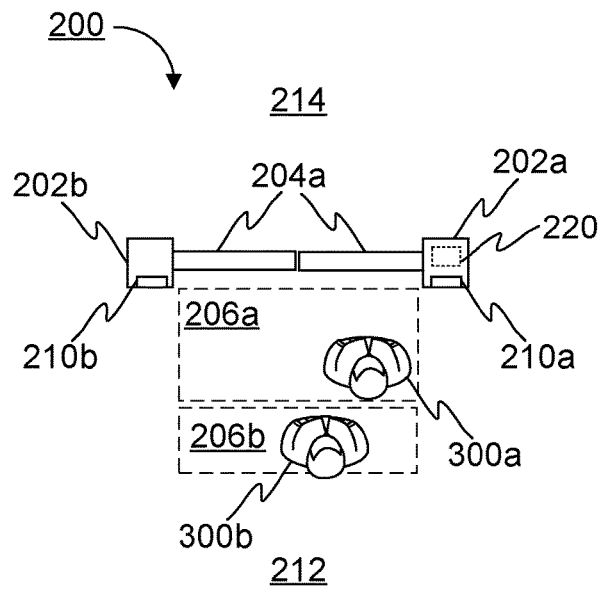
FIG. 4C illustrates schematically an example of a possible tailgating situation.

As discussed above, the access gate device 200 comprises one or more 3D cameras 210, 210a-210b arranged at least on the entry side 212 of the access gate device 200. This enables a detection of at least one user 300, 300a, 300b approaching to the access gate device 200 from the entry side 212 of the gate device 200. FIGS. 4A and 4B illustrate an example of the access gate device 200, where the access gate device 200 is otherwise similar to the access gate device 200 as illustrated in FIGS. 2A, 2B and 3 and discussed above, but the access gate device 200 comprises two 3D cameras 210a, 210b, e.g. a first 3D camera 210a and a second 3D camera 210b, arranged at least on an entry side 212 of the access gate device 200. The use of at least two 3D cameras 210a, 210b together with the at least two consecutive volumetric detection zones 206a, 206b on the same side of the access gate device 200 for detecting the users enables also a detection of user(s) locating behind user(s) closer to the at least two 3D cameras 210a, 210b, which enables avoiding tailgating. In the tailgating, an unidentified and/or unauthorized user passes via the access gate device 200 after an identified and/or authorized user with one access. In other words, an unidentified and/or unauthorized user is trying to utilize tailgating to access via the access gate device 200 after an identified and/or authorized user. FIG. 4C illustrates an example of a possible tailgating situation, wherein a first user 300a is an identified user having an authorization to access via the access gate device 200 and a second user 300b is an unidentified user without an authorization to access via the access gate device 200. If the access gate device 200 comprises only one 3D camera, e.g. the first 3D camera 210a arranged to the first pole 202a in the example of FIG. 4C, the second user 300b is behind the first user 300b and the presence of the second user 300b inside at least one of the at least two volumetric detection zones 206a, 206b cannot be detected based on the 3D depth data obtained from the first 3D camera 210a. Whereas, if the access gate device 200 comprises at least two 3D cameras, e.g. the first 3D camera 210a arranged to the first pole 202a and the second camera 210b arranged to the second pole 202b in the example of FIG. 4C, the presence of the second user 300b inside at least one of the at least two volumetric detection zones 206a, 206b can also be detected based on the 3D depth data obtained from the second 3D camera 210b. Thus, the unwanted tailgating of the second user 300b from the entry side 212 may be avoided by using at least two 3D cameras 210, 210a-210b arranged at least on the entry side 212 of the access gate device 200.

The two 3D cameras 210a, 210b may be arranged to the two poles 202a, 202b of the access gate device 200 so that one of the two 3D cameras 210a, 210b is arranged to one of the two poles 202a, 202b of the access gate device 200 and the other one of the two 3D cameras 210a, 210b is arranged to the other one of the two poles 202a, 202b of the access gate device 200. Preferably, the two 3D cameras 210a, 210b may be arranged to the two poles 202a, 202b of the access gate device 200 so that one of the two 3D cameras 210a, 210b is arranged to one of the two poles 202a, 202b of the access gate device 200 substantially as high as possible and the other one of the two 3D cameras 210a, 210b is arranged to the other one of the two poles 202a, 202b of the access gate device 200 substantially as low as possible. This enables that as unobstructed view range of the two 3D cameras 210a, 210b as possible. In the example of FIG. 4B, the first 3D camera 210a is arranged to the first pole 202a substantially as high as possible and the second 3D camera 210b is arranged to the second pole 202b substantially as low as possible.

Figure 5A:
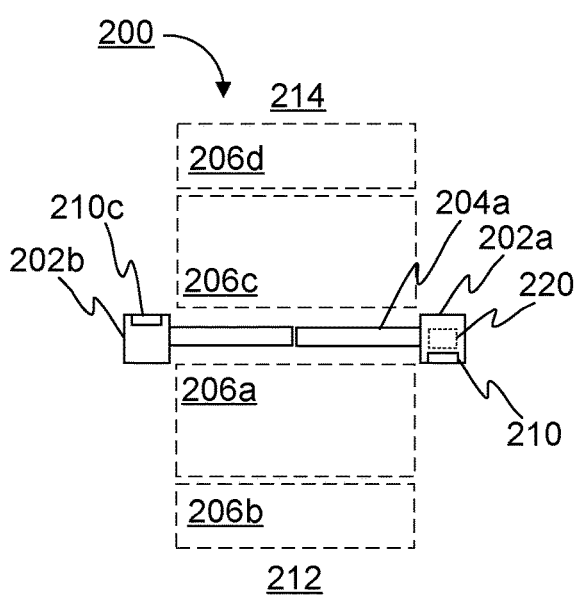
FIGS. 5A and 5B illustrate schematically another example of an access gate device.
Figure 5B:
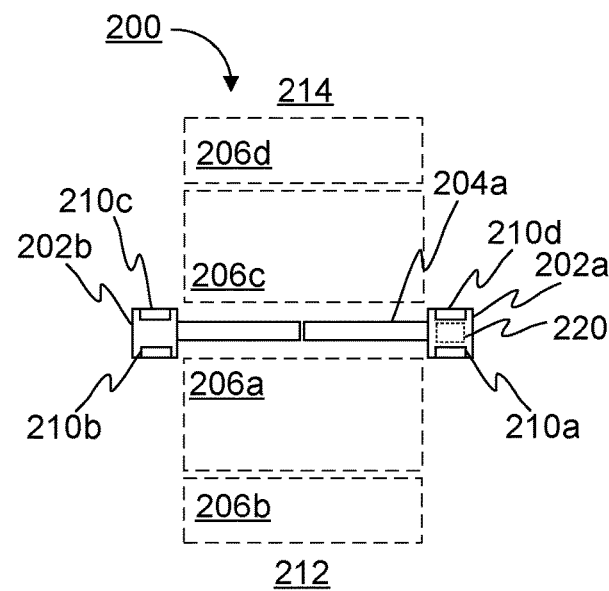

Above the operation of the access gate device 200 is described so that one or more 3D cameras 210, 210a, 210b are arranged on the first side 212 of the access gate device 200, i.e. on the entry side 212 of the access gate device 200. However, the access gate device 200 may further comprise one or more 3D cameras 210c, 210d arranged on the second side 214 of the access gate device 200, i.e. on the exit side 214 of the access gate device 200. This enables a detection of at least one user 300 approaching to the access gate device 200 from the exit side 214 of the gate device 200. The control unit 220 may further be configured to define at least two consecutive volumetric detection zones 206c, 206d in front of the access gate device 200 on the exit side 214 of the access gate device 200. The view range of the one or more 3D cameras 210c, 210d arranged on the exit side 214 covers the at least two volumetric detection zones 206c, 206d on the exit side 214 similarly as described above referring to one or more 3D cameras 210a, 210b and the at least two volumetric detection zones 206a, 206b on the entry side 212. The control unit 220 may further be configured to detect a presence of at least one user 300 inside at least one of the volumetric detection zones 206c, 206d on the exit side 214 based on the 3D depth data obtained from at least one of the one or more 3D cameras 210c, 210d arranged on the exit side 214. The control unit 220 may obtain the 3D depth data from the one or more 3D cameras 210c, 210d arranged on the exit side 214 continuously. In response to the detection of the presence of the at least one user 300 based on the 3D depth data obtained from at least one of the one or more 3D cameras 210c, 210d arranged on the exit side 214, the control unit 220 may further be configured to generate further detection data for controlling access of the users 300 via the access gate device 200. FIG. 5A illustrates an example of the access gate device 200 comprising further one 3D camera 210c arranged on the exit side 214 of the access gate device 200. In the example of FIG. 5A one 3D camera 210 is arranged to the entry side 212 of the access gate device 200, but also more than one 3D cameras 210, 210a, 210b may be arranged to the entry side 212 of the access gate device 200 as described above. The example of FIG. 5A also illustrates the at least two consecutive volumetric detection zones 206c, 206d in front of the access gate device 200 on the exit side 214 of the access gate device 200 defined by the control unit 220 and the at least two consecutive volumetric detection zones 206a, 206b in front of the access gate device 200 on the entry side 212 of the access gate device 200 defined by the control unit 220. In the example of FIG. 5A the 3D camera 210c arranged on the exit side 214 of the access gate device 200 is arranged to the other pole 202b, i.e. the second pole, than the 3D camera 210 arranged on the entry side 212 of the access gate device 200, which is arranged to the pole 202a, i.e. the first pole. However, the 3D camera 210c arranged to the exit side 214 of the access gate device 200 may also be arranged to the same pole 202a, 202b as the 3D camera 210a arranged on the entry side 212 of the access gate device 200. FIG. 5B illustrates another example of the access gate device 200 comprising further two 3D cameras 210c, 210b arranged on the exit side 214 of the access gate device 200. In the example of FIG. 5B two 3D cameras 210a, 210b are arranged to the entry side 212 of the access gate device 200, but also only one 3D camera 210 may be arranged to the entry side 212 of the access gate device 200 as described above. The example of FIG. 5B also illustrates the at least two consecutive volumetric detection zones 206c, 206d in front of the access gate device 200 on the exit side 214 of the access gate device 200 defined by the control unit 220 and the at least two consecutive volumetric detection zones 206a, 206b in front of the access gate device 200 on the entry side 212 of the access gate device 200 defined by the control unit 220. The one or more 3D cameras 210c, 210d may be arranged to the pole(s) 202a, 202b of the access gate device 200 on the exit side 214 of the access gate device 200 similarly as defined above referring to the one or more 3D cameras 210, 210a, 210b arranged to the pole(s) 202a, 202b of the access gate device 200 on the entry side 212 of the access gate device 200. The use of the at least two 3D cameras 210c, 210c on the exit side 212 together with the at least two consecutive volumetric detection zones 206c, 206c defined on the exit side 214 of the access gate device 200 enables avoiding tailgating also from the exit side 214 similarly as discussed above referring to FIG. 4C.

Figures 6, 7:
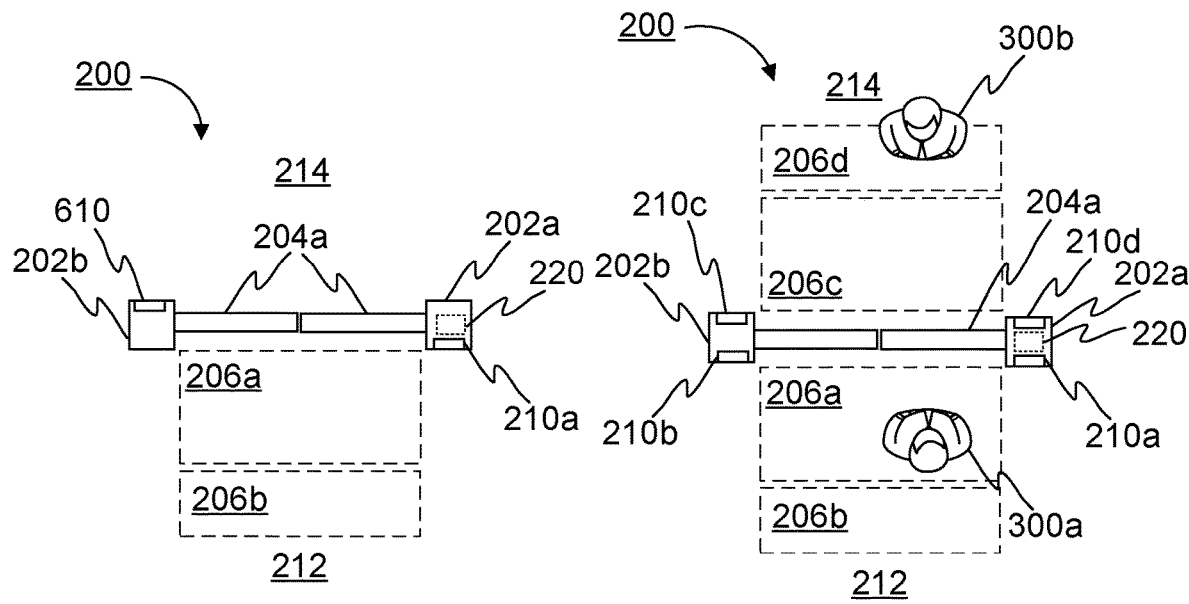
FIG. 6 illustrates schematically another example of an access gate device.
FIG. 7 illustrates schematically an example of a prioritizing situation.

Alternatively, the access gate device 200 may further comprise at least one sensor device 610 arranged on the exit side 214 of the access gate device 200 to provide sensor data. This enables a simple way to detect the users 300 approaching the access gate device 200 from the exit side 214 of the gate device 200. However, the use of the at least one sensor device 610 arranged to the exit side 214 of the access gate device 200 for detecting users 300 approaching the access gate device 200 from the exit side 214 of the gate device 200 does not enable the use of the at least two detection zones 206c, 206d on the exit side 214. The control unit 220 may be configured to detect at least one user 300 approaching the access gate device 200 from the exit side 214 based on the sensor data obtained from the at least one sensor device 610. In response to the detection of the at least one user 300 approaching the access gate device 200 based on the sensor data obtained from the at least one sensor device 610, the control unit 220 may be configured to generate further detection data for controlling access of users via the access gate device 200. The at least one sensor device 610 may for example an infrared camera. FIG. 6 illustrates schematically an example of the access gate device 200 comprising the at least one sensor device 610 arranged on the exit side 214 of the access gate device 200.

The further detection data generated in response to the detection of the at least one user 300 approaching the access gate device 200 based on the sensor data obtained from the at least one sensor device 610 or in response to the detection of the presence of the at least one user 300 based on the sensor data obtained from the at least one sensor device 610 based on the 3D depth data obtained from at least one of the one or more 3D cameras 210c, 210d arranged on the exit side 214 may for example be used for controlling the access of the users 300, 300a, 300b via the access gate device 200 from the exit site 214 to the entry side 212. Alternatively or in addition, the further detection data may for example be used for prioritizing access via the access gate device 200 either from the entry side 212 of the access gate device 200 or from the exit side of the access gate device 200. In other words, the further detection data may be used for restricting the access of the user(s) 300, 300a, 300b approaching the access gate device 200 from the exit side 214 of the access gate device 200, if the detection data representing the presence of the at least one user 300, 300a, 300b on the entry side 212 of the access gate device 200 has been generated before the generation of the further detection data or the other way around. FIG. 7 illustrates schematically an example of a prioritizing situation, where a first user 300a is approaching the access gate device 200 from the entry side 212 of the access gate device 200 and a second user 300b is approaching the access gate device 200 from the exit side 214. The control unit 220 detects first the presence of the first user 300a inside at least one of the volumetric detection zones 206a, 206b on the entry side 212 of the access gate device 200 based on the 3D depth data obtained from at least one of the one or more 3D cameras 210, 210a, 210b arranged on the entry side 212 of the access gate device 200 and generates the detection data in response to the detection of the presence of the first user 310a for controlling access of users via the access gate device 200. Subsequently, the control unit 220 detects the presence of the second user 300b inside at least one of the volumetric detection zones 206c, 206d on the exit side 214 of the access gate device 200 based on the 3D depth data obtained from at least one of the one or more 3D cameras 210c, 210d arranged on the exit side 214 of the access gate device 200 and generates the further detection data in response to the detection of the presence of the second user 310b for controlling access of users via the access gate device 200. The control unit 220 may control the at least one user restriction device 204a, 204b, e.g. by opening the at least one physical restriction device 204a, generating a visual alert via the at least one visual restriction device 204b, and/or generating an audible alert via the at least one audible restriction device to indicate allowed access, to allow the first user 310a to access via the access gate device 200 from the entry side 212 of the access gate device 200 and at the same time restrict the access of the second user 310b via the access gate device 200, e.g. by generating a visual alert via the at least one visual restriction device 204b, and/or generating an audible alert via the at least one audible restriction device to indicate denied access. After the first user 310a has accessed via the access gate device 200, the control unit 220 may control the at least one user restriction device 204a, 204b, e.g. by opening the at least one physical restriction device 204a and generating a visual alert via the at least one visual restriction device 204b, and/or generating an audible alert via the at least one audible restriction device to indicate allowed access, to allow the second user 310b to access via the access gate device 200 from the exit side 214 of the access gate device 200.

Figure 8:
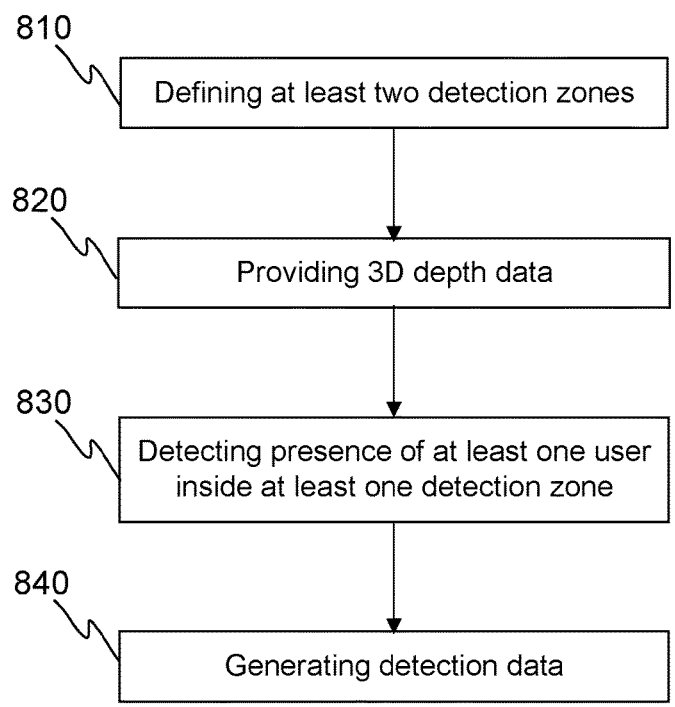
FIG. 8 illustrates schematically a flow chart of an example of a method for controlling an access gate device.

FIG. 8 illustrates schematically a flow chart of an example of a method for controlling an access gate device 200 described above.

At a step 810, the control unit 220 defines the at least two consecutive volumetric detection zones 206a-206d in front of the access gate device 200 at least on the entry side 212 of the access gate device 200 as described above. According to an example, the control unit 220 may further adjust at least one dimension of at least one of the at least two volumetric detection zones 206a-206d as also described above.

At a step 820, each of the one or more 3D cameras 210, 210a-210d provides 3D depth data of a view range of said 3D camera 210, 210a-210d as described above. The view range of the one or more 3D cameras 210 arranged on the entry side 212 covers the at least two volumetric detection zones 206a, 206b on the entry side 212 of the access gate device 200. The one or more 3D cameras 210, 210a, 210b may be arranged to the pole(s) 202a, 202b of the access gate device 200 on the entry side 212 of the access gate device 200 as described above.

At a step 830, the control unit 220 detects a presence of at least one user 300 inside at least one of the at least two volumetric detection zones 206a, 206b on the entry side 212 based on the 3D depth data obtained from at least one of the one or more 3D cameras 210, 210a, 210b arranged on the entry side 212 of the access gate device 200 as discussed above. Use of at least two 3D cameras 210a, 210b together with the at least two consecutive volumetric detection zones 206a, 206b on the same side of the access gate device 200 for detecting the users 300 enables also a detection of user(s) locating behind user(s) closer to the at least two 3D cameras 210a, 210b, which enables avoiding tailgating as also discussed above.

At a step 840, the control unit 220 generates detection data for controlling access of users via the access gate device 200 in response to the detection of the presence of the at least one user 300 based on the 3D depth data at the step 830 as described above.

As discussed above, the access gate device 200 may further comprise one or more 3D cameras 210c, 210d arranged on the second side 214 of the access gate device 200, i.e. on the exit side 214 of the access gate device 200. This enables a detection of the at least one user 300 approaching to the access gate device 200 from the exit side 214 of the gate device 200. If the access gate device 200 further comprises the one or more 3D cameras 210c, 210d arranged on the exit side 214 of the access gate device 200, at the step 810, the control unit 220 may further define at least two consecutive volumetric detection zones 206c, 206d in front of the access gate device 200 on the exit side 214 of the access gate device 200. The view range of the one or more 3D cameras 210c, 210d arranged on the exit side 214 covers the at least two volumetric detection zones 206c, 206d on the exit side 214 similarly as described above referring to one or more 3D cameras 210a, 210b and the at least two volumetric detection zones 206a, 206b on the entry side 212. At the step 830, the control unit 220 may further detect a presence of at least one user 300 inside at least one of the volumetric detection zones 206c, 206d on the exit side 214 based on the 3D depth data obtained from at least one of the one or more 3D cameras 210c, 210d arranged on the exit side 214 at the step 820. At the step 840, the control unit 220 may further generate further detection data for controlling access of the users 300 via the access gate device 200, in response to the detection of the presence of the at least one user 300 based on the 3D depth data obtained from at least one of the one or more 3D cameras 210c, 210d arranged on the exit side 214. At the step 820, the one or more 3D cameras 210, 210a, 210b arranged on the entry side 212 and the one or more 3D cameras 210c, 210d arranged on the exit side 212 may provide the 3D depth data continuously. The control unit 220 may detect, i.e. is capable to detect, at the step 830 the presence of the at least one user 300 inside at least one of the volumetric detection zones 206a, 206b on the entry side 212 and the presence of the at least one user 300 inside at least one of the volumetric detection zones 206c, 206d on the exit side 214 simultaneously or non-simultaneously depending on whether the at least one user locates inside the at least one of the volumetric detection zones 206a, 206b on the entry side 212 and/or inside the at least one of the volumetric detection zones 206c, 206d on the exit side 214. Similarly, the control unit 220 may be configured to generate at the step 840 the detection data and the further detection data simultaneously or non-simultaneously depending whether the at least one user 300 is detected at the step 830 inside the at least one of the volumetric detection zones 206a, 206b on the entry side 212 and/or inside the at least one of the volumetric detection zones 206c, 206d on the exit side 214.

Figure 9:
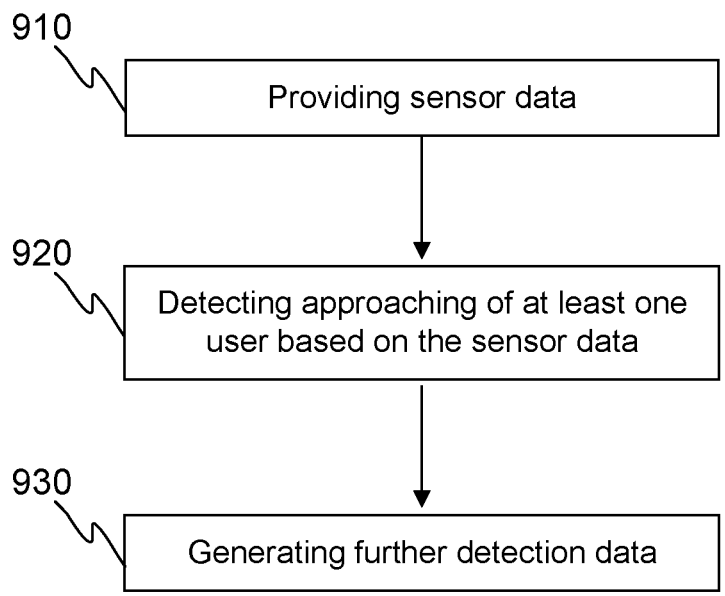
FIG. 9 illustrates schematically a flow chart of another example of a method for controlling an access gate device.

As also discussed above alternatively, the access gate device 200 may further comprise at least one sensor device 610 arranged on the exit side 214 of the access gate device 200 to provide sensor data. FIG. 9 illustrates schematically a flow chart of another example of a method for controlling an access gate device 200 comprising the at least one sensor device 610 arranged on the exit side 214 of the access gate device 200. At a step 910, the at least one sensor device provides the sensor data. At a step 920, the control unit 220 may detect at least one user 300 approaching the access gate device 200 from the exit side 214 based on the sensor data obtained from the at least one sensor device 610. At a step 830, the control unit 220 may generate further detection data for controlling access of users via the access gate device 200, in response to the detection of the at least one user 300 approaching the access gate device 200 based on the sensor data obtained from the at least one sensor device 610. The steps 910-930 may be performed simultaneously or non-simultaneously with one or more of the steps 810-840.

Figure 10:
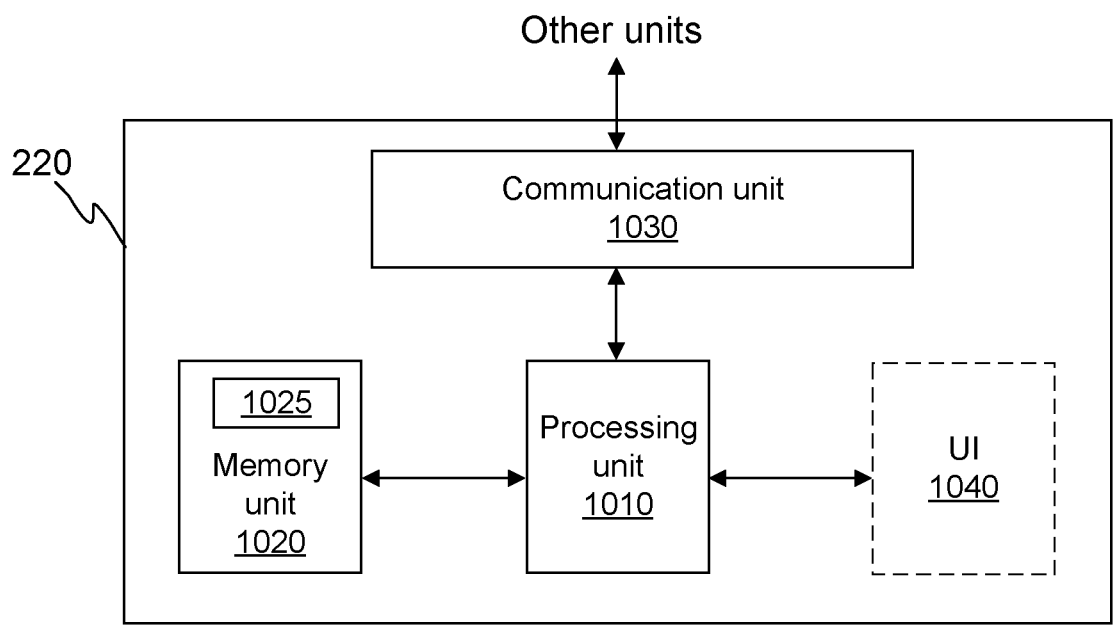
FIG. 10 illustrates schematically an example of components of a control unit of an access gate device.

FIG. 10 schematically illustrates an example of components of the control unit 220. The control unit 220 may comprise a processing unit 1010 comprising one or more processors, a memory unit 1020 comprising one or more memories, a communication interface unit 1030, and possibly a user interface (UI) unit 1010. The mentioned elements may be communicatively coupled to each other with e.g. an internal bus. The memory unit 1020 may store and maintain portions of a computer program (code) 1025 and any other data, e.g. the 3D depth data and/or the user identification data. The computer program 1025 may comprise instructions which, when the computer program 1025 is executed by the processing unit 1010 of the control unit 220 may cause the processing unit 1010, and thus the control unit 220 to carry out desired tasks, e.g. the operations of the control unit 220 and/or at least some of the method steps described above. The processing unit 1010 may thus be arranged to access the memory unit 1020 and retrieve and store any information therefrom and thereto. For sake of clarity, the processor herein refers to any unit suitable for processing information and control the operation of the control unit 220, among other tasks. The operations may also be implemented with a microcontroller solution with embedded software. Similarly, the memory unit 1020 is not limited to a certain type of memory only, but any memory type suitable for storing the described pieces of information may be applied in the context of the present invention. The communication interface unit 1030 provides an interface for communication with any external unit, e.g. the one or more 3D cameras 210, 210a-210d, the at least one sensor device 610, the at least one restriction device 204a, 204b, the at least one user identification device 208, one or more databases, and/or any other external unit. The communication interface unit 1030 may comprise one or more communication devices, for communication with the other units. The one or more user interface units 1040 may comprise one or more input/output (I/O) devices, such as buttons, keyboard, touch screen, microphone, loudspeaker, display and so on, for receiving user input and outputting information. The computer program 1025 may be a computer program product that may be comprised in a tangible non-volatile (nontransitory) computer-readable medium bearing the computer program code 1025 embodied therein for use with a computer, i.e. the control unit 220.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An access gate device comprising:
   one or more support posts;
   one or more entry barriers configured to selectively block access to an entry path extending from an entry side to an exit side of said access gate device, an end of each of the one or more entry barriers being supportably connected to one of said one or more entry barriers;
   one or more three-dimensional (3D) cameras arranged at least on an entry side of the access gate device, each of the one or more 3D cameras being configured to provide 3D depth data of a view range of said 3D camera, each of said 3D cameras being arranged on one of said one or more support posts; and
   a control unit configured to:
      define at least two consecutive volumetric detection zones in front of the access gate device at least on the entry side, wherein the view range of the one or more 3D cameras-arranged on the entry side covers the at least two volumetric detection zones on the entry side;
      detect a presence of at least one user inside at least one of the volumetric detection zones on the entry side based on the 3D depth data obtained from at least one of the at least one or more 3D cameras arranged on the entry side; and
      generate detection data in response to the detection of the presence of the at least one user for controlling access of users via the access gate device.

2. The access gate device according to claim 1, comprising at least two 3D cameras arranged at least on the entry side of the access gate device.

3. The access gate device according to claim 1, further comprising one or more 3D cameras arranged on an exit side of the access gate device, wherein the control unit is further configured to:
   define at least two consecutive volumetric detection zones in front of the access gate device-on the exit side, wherein the view range of the one or more 3D cameras arranged on the exit side-covers the at least two volumetric detection zones on the exit side;
   detect a presence of at least one user inside at least one of the volumetric detection zones on the exit side based on the 3D depth data from at least one of the one or more 3D cameras arranged on the exit side; and
   generate further detection data in response to the detection of the presence of the at least one user for controlling access of the users via the access gate device.

4. The access gate device according to claim 3, comprising at least two 3D cameras arranged on the exit side of the access gate device.

5. The access gate device according to claim 1, further comprising at least one sensor device arranged on an exit side of the access gate device to provide sensor data, wherein the control unit is configured to:
   detect at least one user approaching the access gate device from the exit side based on the sensor data obtained from the at least one sensor device; and
   generate further detection data in response to the detection of the at least one user approaching the access gate device for controlling access of users via the access gate device.

6. The access gate device according to claim 5, wherein the at least one sensor device is an infrared camera.

7. The access gate device according to claim 1, wherein the one or more 3D cameras comprises one or more Time-of-Flight (ToF) cameras, one or more stereo cameras, and/or one or more cameras based on structured light.

8. The access gate device according to claim 1, wherein the control unit is further configured to adjust at least one dimension of at least one of the at least two volumetric detection zones.

9. The access gate device according to claim 1, further comprising:
  at least one user restriction device; and
  at least one user identification device for providing user identification data,
  wherein the control unit is further configured to control the at least one user restriction device to allow access via the access gate device, when the identification data relates to an identified user, and to control the at least one user restriction device to restrict access via the access gate device, when the identification data relates to the unidentified user.

10. The access gate device according to claim 1, wherein the 3D depth data represent at least one depth image and/or 3D point cloud data.

11. The access gate device according to claim 1, comprising two vertical poles forming a passageway of the access gate device.

12. The access gate device according to claim 11, wherein the one or more 3D cameras are arranged to at least one of the two vertical poles at least on the entry side of the access gate device.

13. A method for controlling the access gate device according to claim 1, the method comprising:
  defining, by a control unit, at least two consecutive volumetric detection zones in front of the access gate device at least on an entry side of the access gate device;
  providing, by one or more 3D cameras arranged at least on the entry side of the access gate device, 3D depth data of a view range of each 3D camera, wherein a view range of the one or more 3D cameras arranged on the entry side covers the at least two volumetric detection zones at the entry side;
  detecting, by the control unit, a presence of at least one user inside at least one of the volumetric detection zones on the entry side based on the 3D depth data obtained from at least one of the one or more 3D cameras arranged on the entry side; and
  generating, by the control unit, detection data in response to the detection of the presence of the at least one user for controlling access of users via the access gate device.

14. The access gate device according to claim 2, further comprising one or more 3D cameras arranged on an exit side of the access gate device, wherein the control unit is further configured to:
  define at least two consecutive volumetric detection zones in front of the access gate device on the exit side, wherein the view range of the one or more 3D cameras arranged on the exit side covers the at least two volumetric detection zones on the exit side;
  detect a presence of at least one user inside at least one of the volumetric detection zones on the exit side based on the 3D depth data from at least one of the one or more 3D cameras arranged on the exit side; and
  generate further detection data in response to the detection of the presence of the at least one user for controlling access of the users via the access gate device.

15. The access gate device according to claim 2, further comprising at least one sensor device arranged on an exit side of the access gate device to provide sensor data, wherein the control unit is configured to:
  detect at least one user approaching the access gate device from the exit side based on the sensor data obtained from the at least one sensor device; and
  generate further detection data in response to the detection of the at least one user approaching the access gate device for controlling access of users via the access gate device.

16. The access gate device according to claim 2, wherein the one or more 3D cameras comprises one or more Time-of-Flight (ToF) cameras, one or more stereo cameras, and/or one or more cameras based on structured light.

17. The access gate device according to claim 3, wherein the one or more 3D cameras comprises one or more Time-of-Flight (ToF) cameras, one or more stereo cameras, and/or one or more cameras based on structured light.

18. The access gate device according to claim 4, wherein the one or more 3D cameras comprises one or more Time-of-Flight (ToF) cameras, one or more stereo cameras, and/or one or more cameras based on structured light.

19. The access gate device according to claim 5, wherein the one or more 3D cameras comprises one or more Time-of-Flight (ToF) cameras, one or more stereo cameras, and/or one or more cameras based on structured light.

20. The access gate device according to claim 6, wherein the one or more 3D cameras comprises one or more Time-of-Flight (ToF) cameras, one or more stereo cameras, and/or one or more cameras based on structured light.

* * * * *